(12) United States Patent
McConnochie et al.

(10) Patent No.: US 7,801,023 B2
(45) Date of Patent: Sep. 21, 2010

(54) MECHANISM FOR EFFICIENT ENDPOINT DISCRIMINATOR ALLOCATION FOR APS PROTECTED MLPPP BUNDLES ON DISTRIBUTED ROUTING SYSTEMS

(75) Inventors: William McConnochie, Nepean (CA); Andrew Dolganow, Kanata (CA)

(73) Assignee: Alcatel Lucent, Paris (FR)

( * ) Notice: Subject to any disclaimer, the term of this patent is extended or adjusted under 35 U.S.C. 154(b) by 288 days.

(21) Appl. No.: 11/902,708

(22) Filed: Sep. 25, 2007

(65) Prior Publication Data

US 2009/0080446 A1  Mar. 26, 2009

(51) Int. Cl.
*H04J 1/00* (2006.01)

(52) U.S. Cl. .................. 370/216; 370/217; 370/225; 370/254; 370/431; 370/464

(58) Field of Classification Search ......... 370/216–228, 370/254–255, 431, 464
See application file for complete search history.

(56) References Cited

U.S. PATENT DOCUMENTS

| | | | | |
|---|---|---|---|---|
| 6,883,055 B2 * | 4/2005 | Chen et al. | ................... | 710/302 |
| 2002/0078232 A1 * | 6/2002 | Simpson et al. | ............. | 709/238 |
| 2004/0100899 A1 * | 5/2004 | Mahamuni | .................. | 370/216 |
| 2005/0102603 A1 * | 5/2005 | Tapper et al. | ............... | 714/770 |
| 2006/0002305 A1 * | 1/2006 | Ginzburg | .................... | 370/241 |
| 2007/0153828 A1 * | 7/2007 | Vishnubhatla et al. | ...... | 370/468 |
| 2007/0211636 A1 * | 9/2007 | Bellur et al. | ................. | 370/238 |
| 2008/0005343 A1 * | 1/2008 | Bauman et al. | ............. | 709/230 |

OTHER PUBLICATIONS

Wikipedia. Point-to-Point Protocol. Sep. 15, 2006. <http://web.archive.org/web/20060915084110/http://en.wikipedia.org/wiki/Point-to-Point_protocol>.*
Wikipedia. MAC address. Sep. 4, 2006. <http://web.archive.org/web/20060904001354/http://en.wikipedia.org/wiki/MAC_address>.*
Cisco Systems. Hot Standby Router Protocol Features and Functionality. Jun. 18, 2006. <http://web.archive.org/web/20060618071912/http://www.cisco.com/en/US/tech/tk648/tk362/technologies_tech_note09186a008 0094a91.shtml>.*

* cited by examiner

*Primary Examiner*—William Trost, IV
*Assistant Examiner*—Ashil Farahmand
(74) *Attorney, Agent, or Firm*—Kramer & Amado P.C.

(57) ABSTRACT

A mechanism and method for efficient endpoint discriminator allocation for APS protected MLPPP bundles on distributed routing systems, including one or more of the following: specifying working and protection MLPPP bundles; retrieving an endpoint discriminator for the working bundle and updating an endpoint discriminator of the protection bundle based on same; specifying MLPPP operating parameters for the bundles; associating the bundles with an APS circuit; adding links and corresponding discriminators in an LCP between a near end bundle and a far end bundle; bringing up an MLPPP session; and adding links between bundles upon an APS switchover.

15 Claims, 3 Drawing Sheets

MECHANISM FOR EFFICIENT ENDPOINT DISCRIMINATOR ALLOCATION FOR APS PROTECTED MLPPP BUNDLES ON DISTRIBUTED ROUTING SYSTEMS

BACKGROUND OF THE INVENTION

1. Field of the Invention

This invention relates generally to maintaining an efficient operation of distributed routing systems.

2. Description of Related Art

In distributed routing systems with Automatic Protection Switching (APS) protection on routers, multilink PPP (MLPPP) is an extension to the Point-to-Point Protocol (PPP). MLPPP is a bandwidth-on-demand protocol that can connect multiple links between two systems as needed to provide bandwidth on demand. The technique is often called bonding or link aggregation.

For example, the two 64-Kbit/sec B channels of Integrated Services Digital Network (ISDN) can be combined to form a single 128-Kbit/sec data channel. Another example would be to bind one or more dial-up asynchronous channels with a leased synchronous line to provide more bandwidth at peak hours of the day.

There is a need to maintain the efficient operation of such distributed routing systems. For example, there is a need for a mechanism and method for efficient endpoint discriminator allocation for APS protected MLPPP bundles on distributed routing systems.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a mechanism and method for efficient endpoint discriminator allocation for APS protected MLPPP bundles on distributed routing systems, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Multilink PPP bundles (MLPPP) typically require an endpoint discriminator to bind member links of a bundle to the bundle itself. In various exemplary embodiments, one or more different types of mechanisms on routers are used for endpoint discriminator. Various exemplary embodiments employ a MAC Media Access Control (MAC) address as an endpoint discriminator. In various exemplary embodiments, the MAC address is pre-allocated on a particular router. In various exemplary embodiments the MAC address is pre-allocated centrally or in a distributed fashion.

Some of the embodiments summarized above are believed to be preferable when the number of MLPPP bundles is small. This is referred to as central allocation. Similarly, some of the embodiments summarized above are believed to be preferable when APS protection is not deployed. This is referred to as distributed allocation.

In various exemplary embodiments, APS protection is in place for scaled routing systems. In some such embodiments, two bundles are de-facto created on working and protecting circuits of an APS-protected port. In various exemplary embodiments, to keep services up, a single MAC address is used as endpoint discriminator.

In various exemplary embodiments, to provide an allocation, MAC addresses are configured statically. This results in a wasting of pre-allocated MAC addresses. Thus, it is undesirable at least in that regard. In various exemplary embodiments, a large number of MAC addresses are pre-allocated centrally to accommodate scaling. This too is believed to be undesirable. Other various embodiments use a different mechanism for endpoint discriminators.

APS protection on routers is commonly implemented as a detection mechanism of a failure only. Therefore two MLPPP bundles are normally created and each of them usually uses its own endpoint discriminator as there is no expectation of an MLPPP bundle staying up during an APS switchover.

APS protection on L2 switches, like ATM, is usually implemented in a physical layer. In various exemplary embodiments, this allows for a single MLPPP processing. Various exemplary embodiments overcome a need to share an endpoint discriminator between two MLPPP bundles.

In various exemplary embodiments, static configuration of a MAC address is used. However, it is believed that this affects or changes MLPPP protocol operations and may require additional MAC allocation beyond that already allocated on the equipment hosting the MLPPP bundles because the uniqueness of MAC addresses in this case is not believed to be guaranteed.

In various exemplary embodiments, MAC addresses pre-allocated to a system centrally are used. However, such embodiments are believed to be undesirable because hose addresses are often limited. It is believed that such addresses might be insufficient to satisfy the need of a large, highly scalable system.

Accordingly, various exemplary embodiments use MAC addresses pre-allocated to a distributed system hosting working circuit of an APS port for both an MLPPP bundle on a working circuit and a protection circuit. In various exemplary embodiments, both the working and the protection MLPPP bundles share the pre-allocated MAC addresses. Thus, in various exemplary embodiments, the working and protection MLPPP bundles do not require static configuration of another MAC address or centrally pre-allocated MAC addresses.

In various exemplary embodiments, when an equipment hosting working circuit goes down and the MAC addresses pre-allocated to it are no longer visible, the MLPPP bundles continue to use MAC addresses learned before the equipment went down. Accordingly, in various exemplary embodiments, when the equipment hosting working circuit comes back up, the MAC addresses are re-learned. Similarly, in various exemplary embodiments where a change in equipment took place while the equipment hosting working circuit was down, the MLPPP endpoint discriminator is changed after the equipment hosting working circuit comes back up.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
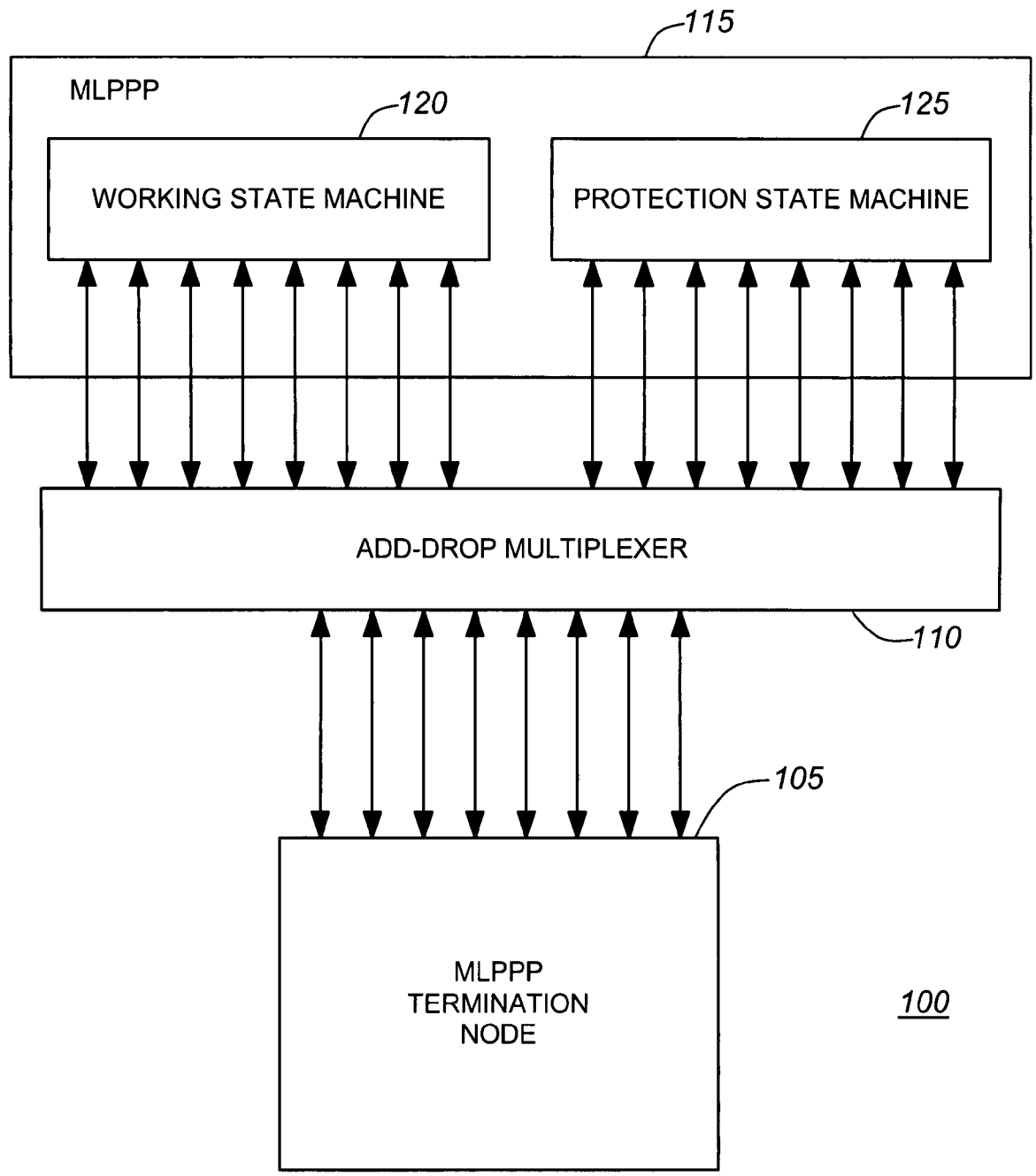
FIG. 1 is a schematic diagram of a first exemplary embodiment of a mechanism for efficient endpoint discriminator allocation for APS protected MLPPP bundles on distributed routing systems.

In various exemplary embodiments, MLPPP uses unique identifiers. In various exemplary embodiments, each of eight links has a link control protocol. In various exemplary embodiments, the link control protocol on each MLPPP link includes an endpoint. In various exemplary embodiments, a global MAC address is used as a common endpoint identifier.

In various exemplary embodiments, when switching from a working bundle to a protection bundle, the same unique identifier is maintained. In various exemplary embodiments, this identifier is unique in all the world. Accordingly, various exemplary embodiments share a MAC address originally assigned to a first MLPPP bundle.

Accordingly, various exemplary embodiments overcome a problem that arises when a media dependent adaptor (MDA) is removed. An MDA is removed, for example, in order to be repaired. In various exemplary embodiments, the MDA is an object such as a link card. However, it should be apparent that, in various exemplary embodiments, the MDA is any currently known or later developed type of media dependent adaptor.

The foregoing will now be described in greater detail in connection with the drawings. Referring now to the drawings, in which like numerals refer to like components or steps, there are disclosed broad aspects of various exemplary embodiments.

FIG. 1 is a schematic diagram of a first exemplary embodiment of a mechanism 100 for efficient endpoint discriminator allocation for APS protected MLPPP bundles on distributed routing systems. Exemplary mechanism 100 includes an MLPPP termination node 105, and add-drop multiplexer 110 and an MLPPP 115. The MLPPP 115 includes a working state machine 120 and a protection state machine 125.

The MLPPP termination node 105 communicates with the add-drop multiplexer 110 along eight lines in the depicted embodiment. These eight lines or links are represented in exemplary mechanism 100 as arrows leading from the MLPPP termination node 105 to the add-drop multiplexer 110. The mechanism 100 is designed for an implementation where it is undesirable for the links of communication to go down.

It should be understood that various exemplary embodiments have any number of links other than eight. This is true of all references herein to specific exemplary embodiments have eight lines or links.

The add-drop multiplexer 110 also communicates with the working state machine 120 through eight lines or links in the depicted embodiment. The add-drop multiplexer 110 likewise communicates with the protection state machine 125 through eight lines or links in the depicted embodiment.

The eight communication lines or links from the add-drop multiplexer 110 to the working state machine 120 are illustrated in exemplary mechanism 100 by eight arrows from the add-drop multiplexer 110 to the working state machine 120. Similarly, the eight communication lines or links from the add-drop multiplexer 110 to the protection state machine 125 are illustrated in exemplary mechanism 100 by eight arrows from the add-drop multiplexer 110 to the protection state machine 125.

The eight links from the add-drop multiplexer 110 to the working state machine 120 correspond to the eight links from the MLPPP termination node 105 to the add-drop multiplexer 110. Likewise, the eight links from the add-drop multiplexer 110 to the protection state machine 125 correspond to the eight links from the MLPPP termination node 105 to the add-drop multiplexer 110.

Accordingly, the eight links from the add-drop multiplexer 110 to the working state machine 120 and the eight links from the add-drop multiplexer 110 to the protection state machine 125 represent duplicative lines of communication between the add-drop multiplexer 110 and the MLPPP 115. By virtue of this redundancy, the protection state machine 125 functions as a backup for the working state machine 120 such that a line of communication can be switched to the protection state machine 125 when a corresponding link between the add-drop multiplexer 110 and the working state machine 120 goes down or a switchover is requested, as, for example, by external stimuli. Accordingly, after such a switch, the roles of the protection state machine 125 and the working state machine 120 are reversed in various exemplary embodiments while the line of communication that went down between the add-drop multiplexer 110 and the working state machine 120 is repaired.

Figure 2:
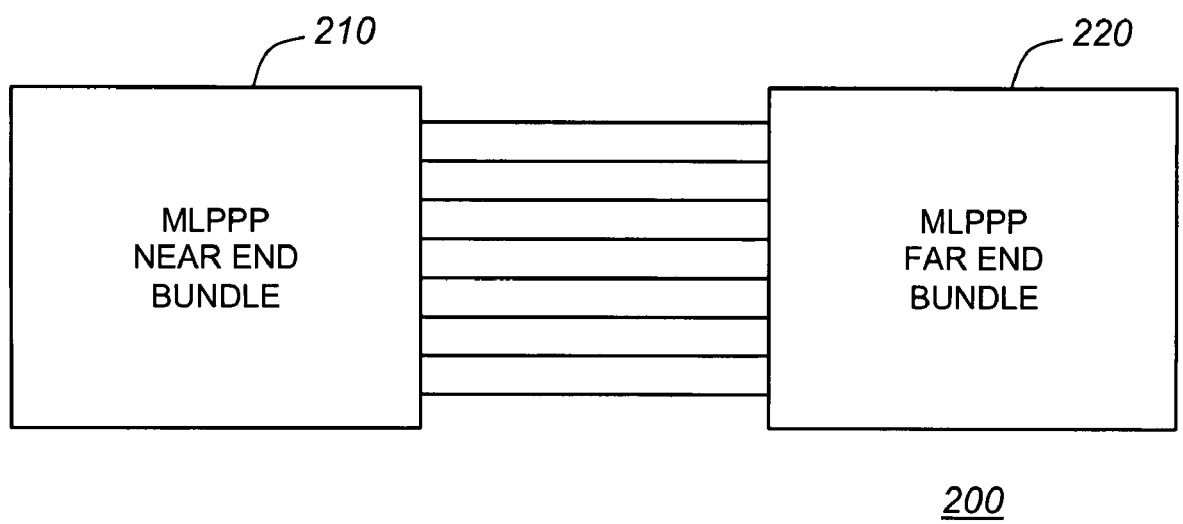
FIG. 2 is a schematic diagram of an exemplary MLPPP near end bundle and an exemplary MLPPP far end bundle in connection with a second exemplary embodiment of a mechanism for efficient endpoint discriminator allocation for APS protected MLPPP bundles on distributed routing systems.

FIG. 2 is a schematic diagram of an exemplary MLPPP near end bundle 210 and an exemplary MLPPP far end bundle 220 in connection with a second exemplary embodiment of a mechanism 200 for efficient endpoint discriminator allocation for APS protected MLPPP bundles on distributed routing systems. The MLPPP near end bundle 210 communicates with the MLPPP far end bundle 220 through eight lines of communication is the depicted embodiment. These eight communication lines or links are represented in exemplary mechanism 200 as eight lines between the MLPPP rear end bundle 210 and the MLPPP far end bundle 220.

Accordingly, in various exemplary embodiments, the MLPPP termination node 105 corresponds to one of the MLPPP near end bundle 210 and the MLPPP far end bundle 220 while the other of the MLPPP near end bundle 210 and the MLPPP far end bundle 220 corresponds to MLPPP 115. These elements will be described in greater detail below in connection with FIG. 3.

In various exemplary embodiments, an ID of the MLPPP near end bundle 210 is learned and subsequently sent to the MLPPP far end bundle 220. In various exemplary embodiments, a Link Control Protocol (LCP) is negotiated to add a link between the MLPPP near end bundle 210 and the MLPPP far end bundle 220. In various exemplary embodiments, one link at a time is added between the MLPPP near end bundle 210 and the MLPPP far end bundle 220. In various exemplary embodiments, an LCP is negotiated for each link between the MLPPP near end bundle 210 and the MLPPP far end bundle 220 as each link is added there between.

In various exemplary embodiments, the ID learned for the MLPPP near end bundle 210 is a MAC address. In various exemplary embodiments, after eight links are established between MLPPP near end bundle 210 and the MLPPP far end bundle 220, all of the links have the same ID.

Figure 3:
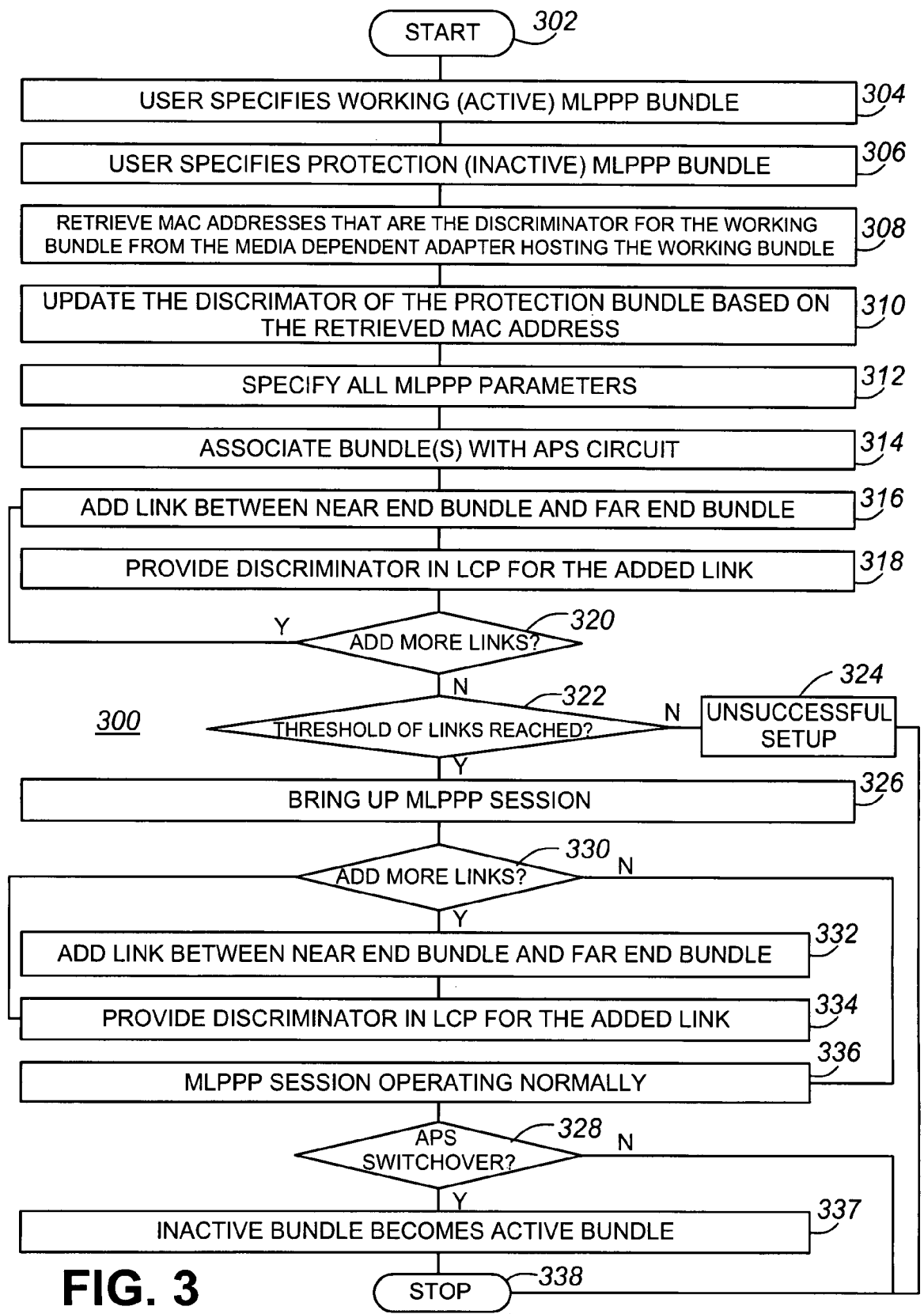
FIG. 3 is a flow chart of an exemplary method of efficient endpoint discriminator allocation for APS protected MLPPP bundles on distributed routing systems.

FIG. 3 is a flow chart of an exemplary method 300 of efficient endpoint discriminator allocation for APS protected MLPPP bundles on distributed routing systems. The method 300 starts in step 302 and proceeds to step 304.

In step 304, a user specifies a working MLPPP bundle. This bundle is considered the active bundle. Following step 304, the method 300 proceeds to step 306.

In step 306, a user specifies a protection or inactive MLPPP bundle. In various exemplary embodiments, the working bundle and the protection bundle are joined together as one master bundle.

Following step 306, the method 300 proceeds to step 308. In step 308, a MAC address that is a discriminator for the working bundle is retrieved. In various exemplary embodiments, this MAC address is retrieved from the media dependent adaptor (MDA) hosting the working bundle.

Following step 308, the method 300 proceeds to step 310. In step 310, the discriminator for the protection bundle is updated based on the MAC address retrieved in step 308. Following step 310, the method proceeds to step 312.

In step 312, all MLPPP parameters are specified. In various exemplary embodiments, a user specifies the MLPPP parameters in step 312. In various exemplary embodiments, the MLPPP parameters are specified once for the near end bundle 210 and once for the MLPP far end bundle 220. In other exemplary embodiments, the MLPPP parameters are only specified for a master bundle.

Following step 312, the method 300 proceeds to step 314. In step 314, the bundle or bundles are associated with an APS circuit. Following step 314, the method 300 proceeds to step 316.

In step 316, a link is added between the near end bundle 210 and the far end bundle 220. Next, in step 318, a discriminator is provided in the LCP for the link added in step 316.

Following step 318, the method 300 proceeds to step 320. In step 320, a determination is made whether more links need to be added between the MLPPP near end bundle 210 and the MLPPP far end bundle 220.

When a determination is made in step 320 that more links need to be added, the method 300 returns to step 316. When a determination is made in step 320 that no more links need to be added, the method 300 proceeds to step 322.

In step 322, a determination is made whether the threshold of links has been reached. For example, in exemplary mechanism 200, the threshold of links is eight. In various exemplary embodiments, the threshold is specified by a user. In various exemplary embodiments, the threshold is in a range of 1 to n, where n is equal to a maximum number of links able to be supported by the particular MLPPP application in use. When a determination is made in step 322 that the threshold of links has not been reached, the method proceeds to step 324.

Step 324 corresponds to the identification of an unsuccessful setup. For example, with respect to exemplary mechanism 200, if the method 300 proceeds to step 322 when fewer than eight links have been obtained between the MLPPP near end bundle 210 and the MLPPP far end bundle 220, then a determination is made in step 322 that the threshold of links has not been reached, and the method 300 proceeds to step 324. Following step 324, the method 300 proceeds to step 338 where the method 300 stops.

When a determination is made in step 322 that the threshold of links has been reached, then the method 300 proceeds to step 326. In step 326, an MLPPP session is brought up and begun. Following step 326, the method 300 proceeds to step 330.

In step 330 an evaluation is performed whether more links need to be added. Until a limit of links is reached, links can be added any time beginning with the MLPPP session being brought up in step 326. One example of when links might be added is during an APS switchover. However, it should be apparent that links can be added at other times as well.

During an APS switchover, it is possible that more links need to be added. In such instances, the method 300 will proceed from step 330 to step 332. However, if no APS switchover or other condition results in a need to add more links, the method 300 proceeds from step 330 to step 336.

A determination in step 330 that more links need to be added corresponds to a determination in step 320 that more links need to be added. Thus, steps 332 and 334 correspond to step 316 and 318, described above. Eventually, when the flow of logic through method 300 gets to step 326, the method 300 will subsequently reach step 336, where the MLPPP session is operating normally, when no more links need to be added.

Following step 336, the method 300 proceeds to step 328. In step 328, an analysis is made whether an APS switchover has occurred. With reference to the discussion of step 330 above, step 328 is deliberately depicted in FIG. 3 out of numerical order with the flow of steps in to illustrate that an APS switchover can occur at other times during the flow of the steps. For example, in various exemplary embodiments, an APS switchover occurs in parallel with the addition of a link in step 330 and step 332.

When a determination is made in step 328 that an APS switchover has not occurred, the method 300 proceeds to step 338 where the method 300 stops. Conversely, when a determination is made in step 328 that an APS switchover has occurred, the method 300 proceeds to step 337.

In step 337, the inactive bundle becomes the active bundle. In various exemplary embodiments, the inactive bundle uses the same ID the previously active bundle was using when the inactive bundle becomes the active bundle in step 337. Following step 337, the method 300 proceeds to step 338 where the method 300 stops.

According to the foregoing, various exemplary embodiments minimize configuration overhead required to establish pseudowires. Various exemplary embodiments use small extensions to existing routing protocols to achieve dynamic routing within a single AS.

Various exemplary embodiments do not require additional MAC pre-allocation or configuration when APS is deployed in routers that are capable of keeping MLPPP and related services up during an APS switchover. In various exemplary embodiments, MLPPP and services are protected using already existing MAC addresses pre-allocated in distributive fashion.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method for efficient endpoint discriminator allocation for Automatic Protection Switching (APS) protected Multi Link Point-to-Point Protocol (MLPPP) bundles on distributed routing systems, comprising:

specifying a working MLPPP bundle;

specifying a protection MLPPP bundle;

retrieving an endpoint discriminator for the working MLPPP bundle;

updating an endpoint discriminator of the protection MLPPP bundle based on the retrieved endpoint discriminator for the working MLPPP bundle, wherein the endpoint discriminator is unique and pre-allocated for the working MLPPP bundle and the protection MLPPP bundle;

specifying MLPPP operating parameters for the working MLPPP bundle and the protection MLPPP bundle;

associating one or more bundles with an APS circuit;

adding one or more links between a near end bundle and a far end bundle;

providing one or more discriminators in a Link Control Protocol (LCP) for the one or more links added between the near end bundle and the far end bundle;

bringing up an MLPPP session; and adding one or more additional links between the near end bundle and the far end bundle upon an APS switchover.

2. The method for efficient endpoint discriminator allocation for APS protected MLPPP bundles on distributed routing systems, according to claim 1, wherein the working MLPPP bundle is specified by a user.

3. The method for efficient endpoint discriminator allocation for APS protected MLPPP bundles on distributed routing systems, according to claim 1, wherein the protection MLPPP bundle is specified by a user.

4. The method for efficient endpoint discriminator allocation for APS protected MLPPP bundles on distributed routing systems, according to claim 1, wherein the endpoint discriminator for the working MLPPP bundle is retrieved from an Media Dependent Adaptor (MDA) hosting the working MLPPP bundle.

5. The method for efficient endpoint discriminator allocation for APS protected MLPPP bundles on distributed routing systems, according to claim 1, wherein the MLPPP operating parameters are specified separately for the working MLPPP bundle and the protection MLPPP bundle.

6. The method for efficient endpoint discriminator allocation for APS protected MLPPP bundles on distributed routing systems, according to claim 1, wherein the endpoint discriminator for the working MLPPP bundle is an Media Access Control (MAC) address.

7. The method for efficient endpoint discriminator allocation for APS protected MLPPP bundles on distributed routing systems, according to claim 6, wherein the MAC address is pre-allocated on a particular router.

8. The method for efficient endpoint discriminator allocation for APS protected MLPPP bundles on distributed routing systems, according to claim 6, wherein the MAC address is pre-allocated centrally and distributed.

9. The method for efficient endpoint discriminator allocation for APS protected MLPPP bundles on distributed routing systems, according to claim 6, wherein a single MAC address is used as the endpoint discriminator for the working MLPPP bundle and the protection MLPPP bundle.

10. The method for efficient endpoint discriminator allocation for APS protected MLPPP bundles on distributed routing systems, according to claim 1, wherein at least one MLPPP bundle remains operational during the APS switchover.

11. The method for efficient endpoint discriminator allocation for APS protected MLPPP bundles on distributed routing systems, according to claim 1, wherein the number of links added between the near end bundle and the far end bundle is eight.

12. The method for efficient endpoint discriminator allocation for APS protected MLPPP bundles on distributed routing systems, according to claim 1, further comprising:

determining that a threshold of links has been reached.

13. The method for efficient endpoint discriminator allocation for APS protected MLPPP bundles on distributed routing systems, according to claim 12, wherein the threshold of links reached is eight.

14. The method for efficient endpoint discriminator allocation for APS protected MLPPP bundles on distributed routing systems, according to claim 1, wherein the MLPPP session remains operational when an MDA is removed.

15. The method for efficient endpoint discriminator allocation for APS protected MLPPP bundles on distributed routing systems, according to claim 14, wherein the MDA is a link card.

* * * * *